(12) United States Patent
Christensen

(10) Patent No.: US 11,918,991 B2
(45) Date of Patent: Mar. 5, 2024

(54) REFORMER FURNACE WITH SUPPORTED REFORMER TUBES

(71) Applicant: HALDOR TOPSØE A/S, Lyngby (DK)

(72) Inventor: Steffen Spangsberg Christensen, Køge (DK)

(73) Assignee: HALDOR TOPSØE A/S, Kgs. Lyngby (DK)

( * ) Notice: Subject to any disclaimer, the term of this patent is extended or adjusted under 35 U.S.C. 154(b) by 0 days.

(21) Appl. No.: 17/624,291

(22) PCT Filed: Sep. 1, 2020

(86) PCT No.: PCT/EP2020/074304
§ 371 (c)(1),
(2) Date: Dec. 31, 2021

(87) PCT Pub. No.: WO2021/043750
PCT Pub. Date: Mar. 11, 2021

(65) Prior Publication Data
US 2022/0362730 A1    Nov. 17, 2022

(30) Foreign Application Priority Data
Sep. 3, 2019 (DK) .......................... PA 2019 01039

(51) Int. Cl.
*B01J 8/06* (2006.01)
(52) U.S. Cl.
CPC .............. *B01J 8/062* (2013.01); *B01J 8/067* (2013.01); *B01J 2208/00115* (2013.01); *B01J 2208/00504* (2013.01)

(58) Field of Classification Search
CPC .. B01J 8/062; B01J 8/067; B01J 2208/00115; B01J 2208/00123; B01J 2208/00185; B01J 2208/00504
See application file for complete search history.

(56) References Cited

U.S. PATENT DOCUMENTS

| 3,446,747 A | 5/1969 | Bongiorno |
| 4,075,035 A | 2/1978 | Trevedy |
| 4,336,229 A * | 6/1982 | Wunderlich ............. B01J 8/062 422/204 |
| 4,714,593 A | 12/1987 | Naito et al. |

(Continued)

FOREIGN PATENT DOCUMENTS

| CA | 1303824 C | 6/1992 |
| CN | 88101254 A | 10/1988 |

(Continued)

OTHER PUBLICATIONS

Danish Search Report dated Mar. 10, 2020 by the Danish Patent Office in Danish Patent Application No. PA 2019 01039.
(Continued)

*Primary Examiner* — Lessanework Seifu
(74) *Attorney, Agent, or Firm* — Boone IP Law

(57) ABSTRACT

A reformer furnace is provided for use in converting a hydrocarbon feed into a synthesis gas stream. The reformer furnace includes at least one bayonet reformer tube located at least partly within an enclosed volume. The reformer furnace includes a first support arranged to support the second end portion of the at least one bayonet reformer tube against the second endwall of the reformer furnace.

11 Claims, 3 Drawing Sheets

(56) References Cited

U.S. PATENT DOCUMENTS

| | | | |
|---|---|---|---|
| 4,848,927 A | 7/1989 | Daily et al. | |
| 4,932,981 A | 6/1990 | Ohsaki et al. | |
| 7,645,437 B1 | 1/2010 | Moore et al. | |
| 8,673,231 B2 * | 3/2014 | Giroudiere | B01J 8/067 422/651 |
| 2004/0248076 A1 | 12/2004 | Kaiser et al. | |
| 2012/0006516 A1 | 1/2012 | Giroudiere et al. | |
| 2012/0277357 A1 | 11/2012 | Hagberg et al. | |
| 2012/0326090 A1 | 12/2012 | Han et al. | |
| 2015/0076410 A1 | 3/2015 | Schlichting et al. | |
| 2015/0114516 A1 | 4/2015 | Knubben | |
| 2018/0019467 A1 | 1/2018 | Zhu et al. | |
| 2019/0039038 A1 | 2/2019 | Guazzotti et al. | |

FOREIGN PATENT DOCUMENTS

| | | |
|---|---|---|
| CN | 1531973 A | 9/2004 |
| CN | 101177240 A | 5/2008 |
| CN | 102888252 A | 1/2013 |
| CN | 103111239 A | 5/2013 |
| CN | 104334267 A | 2/2015 |
| CN | 109689567 A | 4/2019 |
| DE | 1542494 A1 | 7/1970 |
| DE | 2948107 A1 | 6/1981 |
| EP | 0194067 A2 | 9/1986 |
| EP | 0334540 A2 | 9/1989 |
| EP | 0535505 A1 | 4/1993 |
| FR | 1530202 A | 6/1968 |
| GB | 1149436 A | 4/1969 |
| GB | 2213496 A | 8/1989 |
| JP | H01208303 A | 8/1989 |
| WO | 2011088982 A1 | 7/2011 |
| WO | 2015132555 A1 | 9/2015 |
| WO | 2018050291 A1 | 3/2018 |

OTHER PUBLICATIONS

International Search Report (PCT/ISA/210) and Written Opinion (PCT/ISA/237) dated Nov. 19, 2020, by the European Patent Office as the International Searching Authority for International Application No. PCT/EP2020/074304.

First Office Action received for Chinese Patent Application No. 201610696461.6, dated Nov. 29, 2023, 11 pages (4 pages of English Translation and 7 pages of Original Document).

International Preliminary Report on Patentability received for PCT Patent Application No. PCT/EP2020/074304, dated Mar. 17, 2022, 8 pages.

* cited by examiner

REFORMER FURNACE WITH SUPPORTED REFORMER TUBES

TECHNICAL FIELD

A reformer furnace is provided for supplying duty for the endothermic reactions of converting a hydrocarbon feed into a synthesis gas stream. The reformer furnace comprises at least one bayonet reformer tube located at least partly within an enclosed volume. The reformer furnace comprises a first support arranged to support the second end portion of said at least one bayonet reformer tube against the second endwall of the reformer furnace.

BACKGROUND

A type of heat exchange reactor presently used in industrial applications is the bayonet tube reactor. Conventional bayonet tube reactors consist of an inner tube coaxially arranged in an outer sheath tube. Catalyst particles are loaded in an annular space defined between the walls of the inner tube and the outer tube. A process stream of reactants is, thereby, reacted by passing the stream through the catalyst in heat conducting relationship with heat conducting medium flowing externally along the wall of the sheath tube. When used in heat requiring endothermic reactions, necessary heat for the reactions in the process stream is supplied by indirect heat exchange with the process stream in the tube. Having passed through the catalyst, the reacted process stream impinges against the closed end of the outer tube, where the stream reverses its direction to the inner tube of the reactor, and is then withdrawn from the reactor as product stream.

Use of bayonet tube reactors in steam reforming of a hydrocarbon process stream is disclosed in European Patent Application No. 334,540, GB Patent Application No. 2,213, 496 and in European Patent Application No. 194,067.

Publication US2015/0076410 discloses a reformer furnace comprising bayonet reformer tubes freely suspended in the reformer furnace. No mechanical connection exists between the closed tube ends of the reformer tubes and the bottom of the reformer furnace. This construction is typical, as it allows good gas flow from external heated gas around the closed tube ends, and thus good heat transfer to the closed tube ends.

A bayonet reformer tube can be up to 10 or 12 meters in length. During the reforming process, any unevenness in heating, catalyst loading or gas flow can lead to undesired bending or flexing of the reformer tube. At the same time, a reformer tube can expand in the longitudinal direction during the reforming processes, and this should be taken into account in the construction of the reformer furnace. It would also beneficial to be able to measure temperature of the bayonet reformer tube, particularly at the closed end thereof. This arrangement also makes it possible to easily measure the process gas temperature at the exit of the catalyst bed for process control.

The present technology aims to address at least one of the above problems.

SUMMARY

In a first aspect the present invention relates to a reformer furnace for use in converting a hydrocarbon feed into a synthesis gas stream, said reformer furnace having an enclosed volume defined by opposing first and second endwalls and at least one sidewall extending between said first and second endwalls;

said reformer furnace comprising at least one bayonet reformer tube located at least partly within said enclosed volume, said at least one reformer tube comprising an first end portion and a second end portion, arranged at opposite ends of said at least one bayonet reformer tube along the length axis Y-Y thereof;

wherein a feed gas inlet for said hydrocarbon feed and a process gas outlet for said synthesis gas stream are arranged in said first end portion of said at least one bayonet reformer tube;

and wherein said second end portion of the at least one bayonet reformer tube is closed;

said reformer furnace further comprising a first support arranged to support the second end portion of said at least one bayonet reformer tube against the second endwall of the reformer furnace to prevent the second end portion (12) of the bayonet reformer tube (10) from being displaced in a direction perpendicular to said central axis Y-Y relative to the reformer furnace (100);

wherein the bayonet reformer tube (10) extends along a central axis Y-Y and said first support (60) is arranged to permit the second end portion (12) of the bayonet reformer tube (10) to be displaced during operation in a direction parallel to said central axis Y-Y relative to the reformer furnace (100).

Additional aspects of the present technology are set out in the dependent claims, the figures and the following description text.

LEGENDS

The technology is described with reference to the enclosed schematic figures, in which.

DETAILED DISCLOSURE

Figure 1:
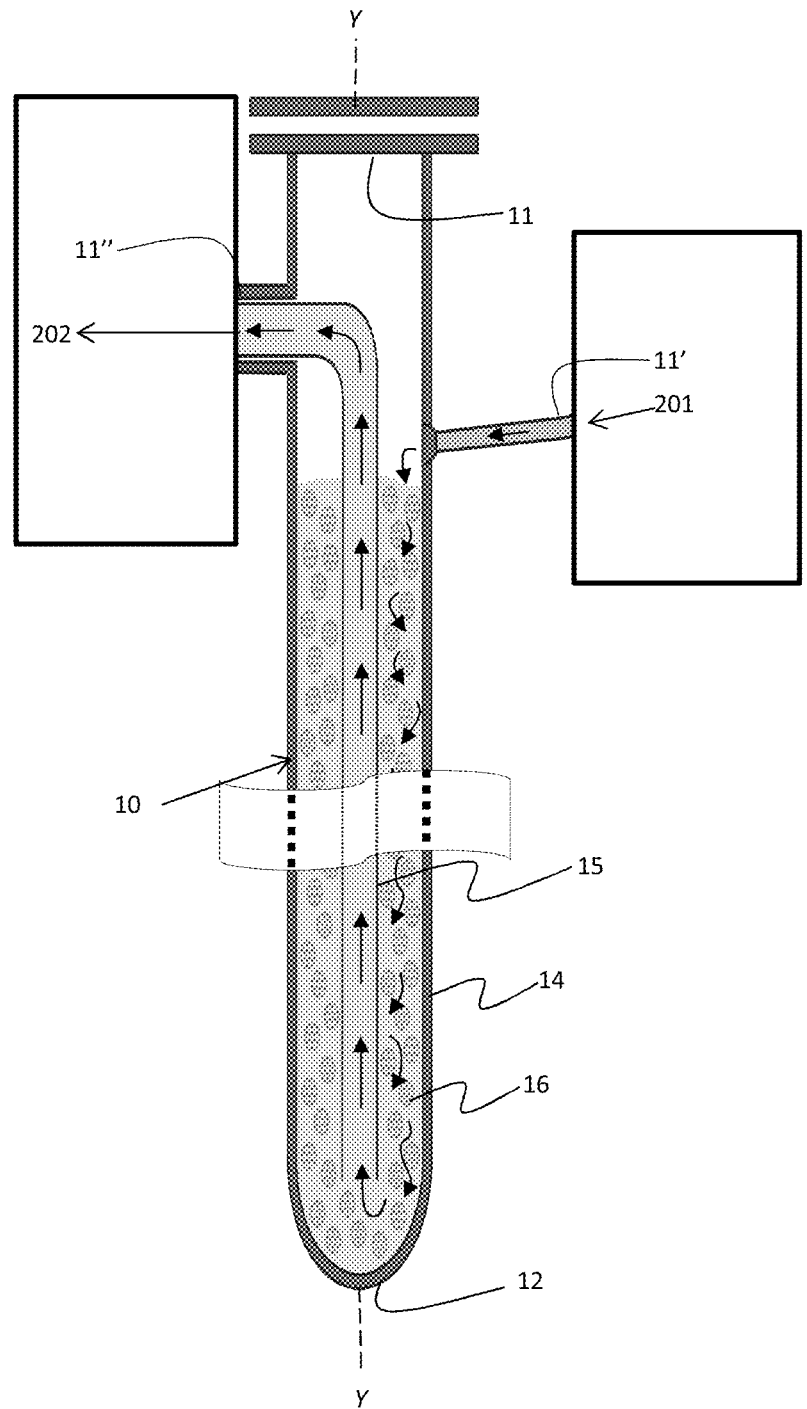
FIG. 1 shows a bayonet reformer tube according to the invention.

Elements of the reformer furnace and bayonet reformer tube(s) are described as being "first" or "second", e.g. a wall of the furnace, or an end portion of the reformer tube(s). All elements of all components indicated as "first" are located at the same end as each other. Typically, the reformer furnace stands vertically on a substantially horizontal surface; in which case the first end or first endwall is located further from the horizontal surface than the second end or endwall.

A reformer furnace is thus provided which is suitable for use in converting a hydrocarbon feed into a synthesis gas stream.

The reformer furnace is typically constructed of steel, with insulating material (such as ceramic material) arranged as required to maintain internal temperatures while protecting external structures from excessive temperatures. The flue gas leaving the reformer normally has a temperature between 1000-1100° C. The reformer furnace has an enclosed volume defined by opposing first and second endwalls and at least one sidewall extending between said first and second endwalls. The walls of the furnace are insulated.

The first and second endwalls are generally planar, but can also be curved. Four sidewalls may be present, so that the reformer furnace is generally cuboid.

One or more heating elements are present within the enclosed volume of the reformer furnace. Suitably, the heating elements are gas burners. Typically, the heating elements are distributed evenly throughout the enclosed volume of the reformer furnace, so that the furnace is heated evenly throughout the enclosed volume.

The reformer furnace comprises at least one bayonet reformer tube located at least partly within said enclosed volume. The bayonet reformer tube is as described generally in EP535505—hereby incorporated by reference—and is as shown schematically in the enclosed FIG. 1. The terms "bayonet reformer tube" and "reformer tube" are used interchangeably in this text.

In a steam reforming process a stream of hydrocarbons and steam is catalytically reformed to a product stream of hydrogen and carbon oxides; typified by the following reactions:

$CH_4+H_2O \rightarrow CO+3H_2 \quad \Delta H°_{298}=-49.3$ kcal/mole

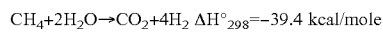

$CH_4+2H_2O \rightarrow CO_2+4H_2 \quad \Delta H°_{298}=-39.4$ kcal/mole

Suitable process conditions (temperatures, pressures, flow rates etc.) and suitable catalysts for such steam reforming processes are known in the art.

In general terms, the bayonet reformer tube comprises an outer tube, and an inner tube arranged within said outer tube. A catalyst bed is arranged between the inner and outer tubes. The bayonet reformer tube is arranged such that hydrocarbon feed entering the bayonet reformer tube via a feed gas inlet passes along the outer tube, where it is converted to synthesis gas over the catalyst bed. The synthesis gas thus produced passes along the inner tube before exiting the bayonet reformer tube via said process gas outlet.

Steam reforming reactions are initiated by contact with a bed of steam reforming catalyst in the tubular heat exchange reactor at temperatures above 350° C. In order to ensure a high conversion of hydrocarbons, the temperature of the hydrocarbon stream is gradually raised during its passage through the catalyst bed. Having passed through the catalyst the reacted process stream leaves the catalyst at the outlet end of the outer reformer tube as a product stream at temperatures between 750° C. and 950° C. Necessary heat for the endothermic reforming reactions proceeding in the catalyst is supplied by radiation from the heated furnace walls. The design of the bayonet reformer tube allows additional heat exchange to take place between the synthesis gas passing along the inner tube with the catalyst bed and gas located in the outer tube.

The bayonet reformer tube has a generally cylindrical form, in which inner and outer tubes have a circular cross-section about a central length axis Y-Y. The reformer tube extends between a first end and a second end. The reformer tube comprises an first end portion and a second end portion arranged at opposite ends of the bayonet reformer tube along the length axis Y-Y thereof. The first end portion is the portion of the reformer tube which extends from the first end towards the second end, while the second end portion is the portion of the reformer tube which extends from the second end towards the first end. First and second end portions do not overlap, and independently extend from the respective first and second ends a distance which is less than 30%, such as less than 20%, such as less than 10% of the entire length of the bayonet reformer tube.

A feed gas inlet for hydrocarbon feed and a process gas outlet for said synthesis gas stream are arranged in the first end portion of the bayonet reformer tube, i.e. in the same end portion. The second end portion of the bayonet reformer tube is closed, so that gas flowing along the outer tube returns to the process gas outlet via the inner tube. The closed second end portion of the at least one bayonet reformer tube is arranged inside the enclosed volume of the reformer furnace, so that the entirety of the reformer tube is heated to the desired level.

Figure 2:
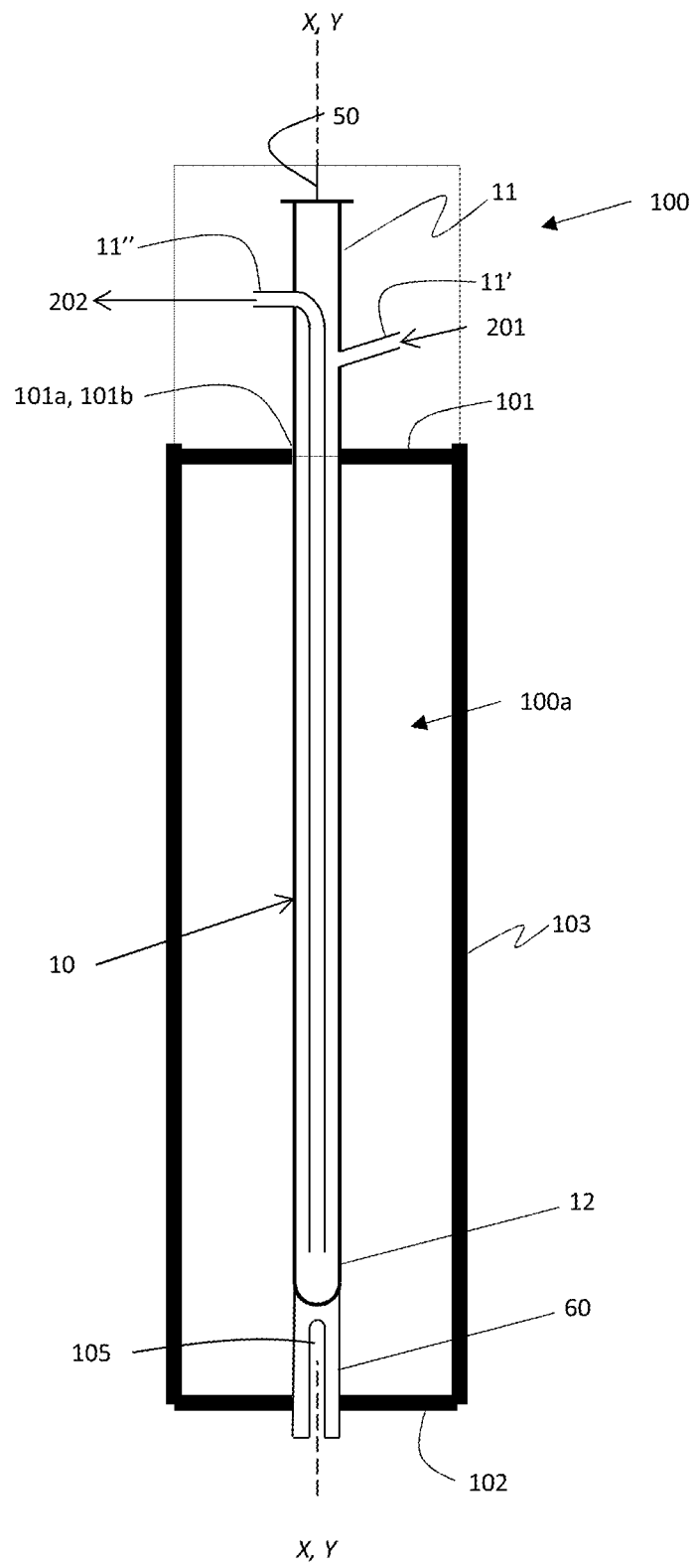
FIGS. 2 and 3 show variations of reformer furnace according to the invention.
Figure 3:
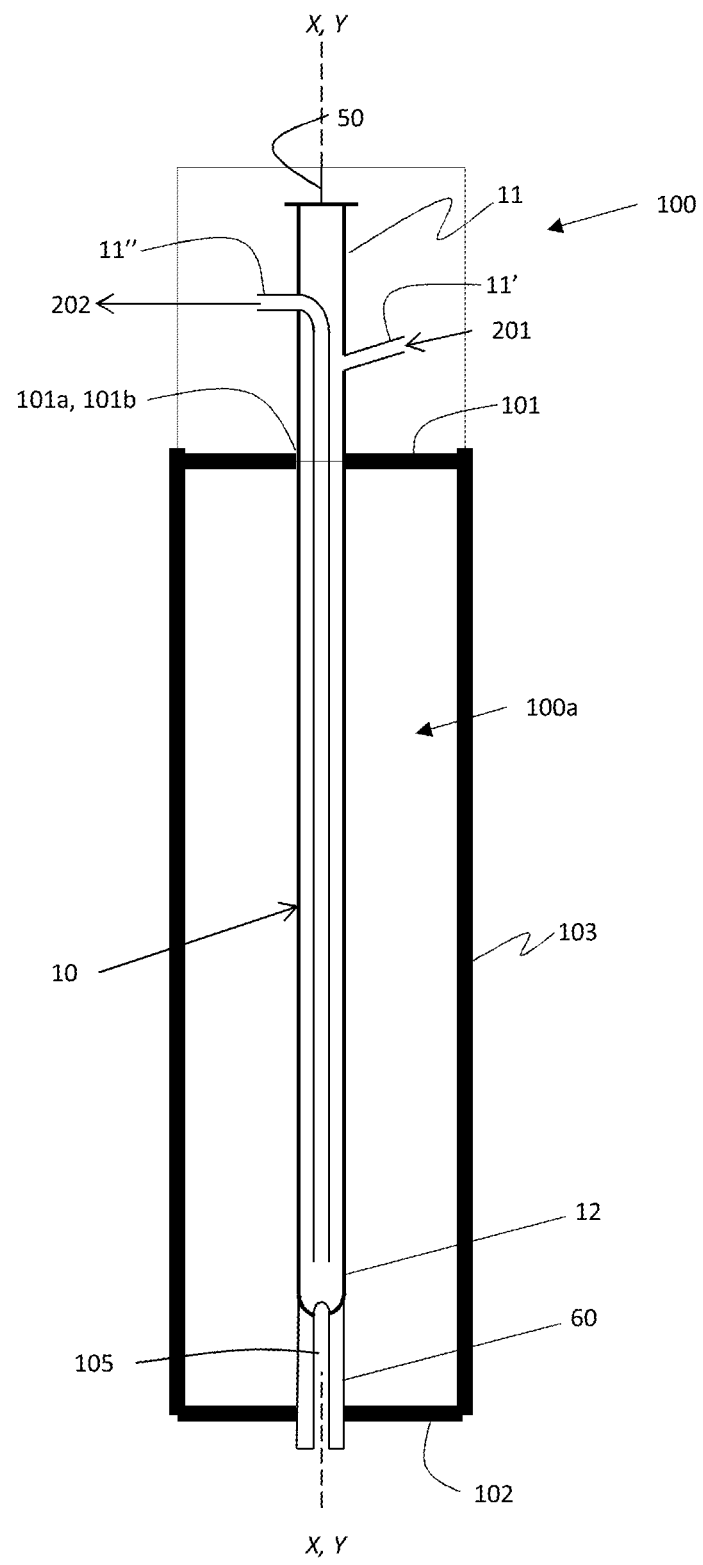

As shown in FIGS. 2 and 3, the reformer furnace further comprises a first support arranged to support the second end portion of the at least one bayonet reformer tube against the second endwall of the reformer furnace. Suitably, the first support is arranged to support the second end portion of the at least one bayonet reformer tube against the second endwall of the reformer furnace. In this manner, undesired bending or flexing of the reformer tube along its length can be reduced. Additionally, a first support can be designed to provide access to the second end portion of the bayonet reformer for e.g. thermocouples or other temperature measuring devices.

As the reformer furnace operates at elevated temperatures, elements thereof will expand under reforming process conditions. Expansion of the bayonet reformer tube primarily takes place along the longitudinal Y-Y axis thereof. At the same time, it is still important to reduce bending or flexing of the reformer tube. The first support is therefore arranged to permit the second end portion of the bayonet reformer tube to be displaced in a direction parallel to said central axis Y-Y relative to the reformer furnace, and—at the same time—to prevent the second end portion of the bayonet reformer tube from being displaced in a direction perpendicular to said central axis Y-Y relative to the reformer furnace.

This function can be achieved e.g. if the second endwall of the reformer furnace comprises an opening in which the first support is located, such that the first support is comprised within the second endwall of the reformer furnace. A flexible seal is arranged in this opening, which prevents hot gas from exiting the reformer furnace, while allowing movement of the first support in a direction perpendicular to said central axis Y-Y relative to the reformer furnace.

The feed gas inlet for the hydrocarbon feed and the process gas outlet for the synthesis gas stream of each bayonet reformer tube are arranged outside the enclosed volume of the reformer furnace. This simplifies construction and allows ready access to the inlet/outlet without having to access the inside of the reformer furnace. In this construction, the first endwall of the reformer furnace comprises an opening having a seal through which the at least one bayonet reformer tube passes. Additionally, the reformer furnace suitably further comprises a second support arranged to support the first end portion of the bayonet reformer tube, at least in the direction of the length axis Y-Y thereof, said second support being arranged outside the enclosed volume of the reformer furnace. This construction also allows the bayonet reformer tube to be extracted from or inserted into the reformer furnace by passing it through the opening in the first endwall of the furnace. The bayonet reformer tube can be lifted or lowered by means of the second support.

In one preferred aspect, the reformer furnace—and preferably the second endwall thereof—comprises at least one closed sleeve extending into the enclosed volume. The closed sleeve is closed at the first end thereof, and open at the lower end thereof. The closed sleeve is arranged to allow insertion of a temperature measuring device (such as a thermocouple) into the enclosed volume of the reformer furnace. This allows measurement of the internal temperature of the reformer furnace at a desired location. In a particularly preferred aspect, the closed end of said closed sleeve extends into the closed end of the second end portion of the at least one bayonet reformer tube, as illustrated in FIG. 3. Such a construction allows measurement of the temperature of the second end portion of the bayonet reformer tube, which is possible with known constructions. The closed sleeve may be comprised in said first support, as also shown in FIG. 3, so that the closed sleeve provides a dual function.

Particular aspects of the construction of the first support are provided. In one aspect, the first support extends from the second end portion of the bayonet reformer tube in the direction of the central axis Y-Y thereof; to the second endwall of the reformer furnace. In effect, such a first support is an extension of the reformer tube along the Y-Y axis. Such a construction allows maximum support for the reformer tube, and also means that the reformer tube and first support can be manufactured in one piece. In an additional aspect, the first support has a cylindrical form about a central axis X-X, and is arranged such that the central axis X-X is an extension of the central axis Y-Y of said bayonet reformer tube. In a further aspect, the radius of the cylindrical first support about the central axis X-X thereof, is substantially the same as the radius of the bayonet reformer tube about the central axis Y-Y thereof. Again, this allows ease of construction of the reformer tube and the first support in one piece, and also allows that both reformer tube and the first support can be inserted and extracted from the reformer furnace via the opening in the first endwall of the furnace.

DETAILED DESCRIPTION OF THE FIGURES

FIG. 1 illustrates a bayonet reformer tube 10 with an outer tube 14, an inner tube 15 arranged within the outer tube 10. A catalyst bed 16 is arranged between the inner 15 and outer 14 tubes. The bayonet reformer tube 10 is arranged such that hydrocarbon feed 201 entering the bayonet reformer tube 10 via said feed gas inlet 11', passes along the outer tube 14 where it is converted to synthesis gas over the catalyst bed 16. The second end portion 12 of the bayonet reformer tube 10 is closed. Therefore, at the second end 12 of the reformer tube 10, the gas flow direction is reversed, and synthesis gas 202 thereby passes along the inner tube 15 before exiting the bayonet reformer tube 10 via the process gas outlet 11". During its passage along the inner tube 15, the hot synthesis gas transfers heat to the catalyst bed 16. The reformer tube 10 has a first end portion 11 and a second end portion 12, arranged at opposite ends thereof along the length axis Y-Y thereof.

FIG. 2 shows a reformer furnace 100 comprising a bayonet reformer tube 10, details of which are as per FIG. 1. For the purposes of clarity, not all details of reformer tube 10 are indicated in FIG. 2. The reformer furnace 100 has an enclosed volume 100a defined by opposing first 101 and second 102 endwalls and at least one sidewall 103 extending between these first 101 and second 102 endwalls. The reformer furnace 100 comprises a first support 60 which supports the second end portion 12 of the bayonet reformer tube 10 against the second endwall 102, in this case.

As shown, the feed gas inlet 11' for the hydrocarbon feed 201 and the process gas outlet 11" for the synthesis gas stream 202 are arranged outside the enclosed volume 100a of the reformer furnace 100. The first endwall 101 of the reformer furnace 100 comprises an opening 101a having a seal 101b through which the at least one bayonet reformer tube 10 passes. A second support 50 is illustrated which can support the first end portion 11 in the direction of the length axis Y-Y. A closed sleeve 105 extends into the enclosed volume 101a, and allows insertion of a temperature measuring device.

FIG. 3 shows a reformer furnace 100 similar to that of FIG. 2. In FIG. 3, the closed end of the closed sleeve 105 extends into the closed end of the second end portion 12 of the at least one bayonet reformer tube 10.

The present invention has been described with reference to a number of aspects and embodiments. These aspects and embodiments may be combined at will by the person skilled in the art while remaining within the scope of the patent claims.

The invention claimed is:

1. A reformer furnace for use in converting a hydrocarbon feed into a synthesis gas stream, said reformer furnace having an enclosed volume defined by opposing first and second endwalls and at least one sidewall extending between said first and second endwalls;
   said reformer furnace comprising at least one bayonet reformer tube located at least partly within said enclosed volume,
   said at least one reformer tube comprising an first end portion and a second end portion, arranged at opposite ends of said at least one bayonet reformer tube along the length axis Y-Y thereof;
   wherein a feed gas inlet for said hydrocarbon feed and a process gas outlet for said synthesis gas stream are arranged in said first end portion of said at least one bayonet reformer tube;
   wherein said second end portion of the at least one bayonet reformer tube is closed;
   wherein said reformer furnace further comprising a first support arranged to support the second end portion of said at least one bayonet reformer tube against the second endwall of the reformer furnace to prevent the second end portion of the bayonet reformer tube from being displaced in a direction perpendicular to said central axis Y-Y relative to the reformer furnace;
   wherein the bayonet reformer tube extends along a central axis Y-Y and said first support is arranged to permit the second end portion of the bayonet reformer tube to be displaced during operation in a direction parallel to said central axis Y-Y relative to the reformer furnace;
   wherein the closed second end portion of the at least one bayonet reformer tube is arranged inside the enclosed volume of the reformer furnace.

2. The reformer furnace according to claim 1, wherein the feed gas inlet for said hydrocarbon feed and the process gas outlet for said synthesis gas stream of said at least one bayonet reformer tube are arranged outside the enclosed volume of the reformer furnace and wherein the first endwall of the reformer furnace comprises an opening having a seal through which the at least one bayonet reformer tube passes.

3. The reformer furnace according to claim 1, said reformer furnace further comprising a second support (50) arranged to support the first end portion of said at least one bayonet reformer tube at least in the direction of the length axis Y-Y thereof, said second support (50) being arranged outside the enclosed volume of the reformer furnace.

4. The reformer furnace according to claim 1, wherein the first support is comprised within the second endwall of the reformer furnace.

5. The reformer furnace according to claim 1, wherein said reformer furnace comprises at least one closed sleeve extending into the enclosed volume, said closed sleeve arranged to allow insertion of a temperature measuring device into the enclosed volume of said reformer furnace.

6. The reformer furnace according to claim 5, wherein said at least one closed sleeve is comprised in said first support.

7. The reformer furnace according to claim 5, wherein the closed end of said closed sleeve extends into the closed end of the second end portion of the at least one bayonet reformer tube.

8. The reformer furnace according to claim 1, wherein said first support extends from the second end portion of the bayonet reformer tube in the direction of the central axis Y-Y thereof; to the second endwall of the reformer furnace.

9. The reformer furnace according to claim 8, wherein said first support has a cylindrical form about a central axis X-X, and is arranged such that the central axis X-X is an extension of the central axis Y-Y of said bayonet reformer tube.

10. The reformer furnace according to claim 9, wherein the radius of the cylindrical first support about the central axis X-X thereof, is substantially the same as the radius of the bayonet reformer tube about the central axis Y-Y thereof.

11. The reformer furnace according to claim 1, wherein said bayonet reformer tube comprises an outer tube, an inner tube arranged within said outer tube, and a catalyst bed arranged between said inner and outer tubes; said bayonet reformer tube being arranged such that hydrocarbon feed entering the bayonet reformer tube via said feed gas inlet, passes along the outer tube where it is converted to synthesis gas over the catalyst bed, and wherein said synthesis gas passes along the inner tube before exiting the bayonet reformer tube via said process gas outlet.

* * * * *